US008732495B2

(12) United States Patent
Hsiao et al.

(10) Patent No.: US 8,732,495 B2
(45) Date of Patent: May 20, 2014

(54) SYSTEMS, APPARATUSES AND METHODS FOR DYNAMIC VOLTAGE AND FREQUENCY CONTROL OF COMPONENTS USED IN A COMPUTER SYSTEM

(75) Inventors: Ivan Hsiao, Sunnyvale, CA (US); Eric Leung, Los Altos, CA (US); Frank Matthews, Walpole, MA (US); Ordin Kuo, Taipei (TW); Dinh Bui, San Jose, CA (US); Duy Pham, Norristown, PA (US); Wallace Ly, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 354 days.

(21) Appl. No.: 12/872,879

(22) Filed: Aug. 31, 2010

(65) Prior Publication Data

US 2012/0054503 A1 Mar. 1, 2012

(51) Int. Cl.
G06F 1/32 (2006.01)
(52) U.S. Cl.
USPC .......................... 713/320; 713/500; 713/600
(58) Field of Classification Search
USPC .................. 713/320–340, 500, 600; 718/105
See application file for complete search history.

(56) References Cited

U.S. PATENT DOCUMENTS

| 5,760,636 | A | 6/1998 | Noble et al. |
| 5,812,860 | A | 9/1998 | Horden et al. |
| 5,884,077 | A * | 3/1999 | Suzuki .......................... 718/105 |
| 5,996,084 | A | 11/1999 | Watts |
| 6,141,762 | A | 10/2000 | Nicol et al. |
| 6,513,124 | B1 | 1/2003 | Furuichi et al. |
| 6,574,739 | B1 * | 6/2003 | Kung et al. .................... 713/322 |
| 6,889,331 | B2 | 5/2005 | Soerensen et al. |
| 7,100,061 | B2 * | 8/2006 | Halepete et al. .............. 713/322 |
| 7,112,978 | B1 | 9/2006 | Koniaris et al. |
| 7,180,322 | B1 | 2/2007 | Koniaris et al. |
| 7,336,090 | B1 | 2/2008 | Koniaris et al. |
| 7,336,092 | B1 | 2/2008 | Koniaris et al. |
| 7,594,126 | B2 | 9/2009 | Yun et al. |
| 7,596,708 | B1 | 9/2009 | Halepete et al. |
| 8,051,307 | B2 * | 11/2011 | Huang et al. .................. 713/300 |
| 8,312,299 | B2 * | 11/2012 | Tremel et al. ................. 713/300 |
| 2002/0083356 | A1 | 6/2002 | Dai |
| 2002/0120882 | A1 * | 8/2002 | Sarangi et al. ................ 713/600 |

(Continued)

OTHER PUBLICATIONS

PCT Search Report for PCT/US2010/047372, mailed May 13, 2011, 3 pages.

(Continued)

*Primary Examiner* — Tim T Vo
*Assistant Examiner* — Kim Huynh
(74) *Attorney, Agent, or Firm* — Traskbritt PC

(57) ABSTRACT

Embodiments of the present disclosure include systems, apparatuses, and methods for dynamic frequency and voltage control of components used in a computer system. A system includes a processor voltage regulator and a system clock generator directly operably with each other. The processor voltage regulator provides a core voltage signal to a processor, and is configured to detect a present processor load state of the processor. The system clock generator is for providing a system clock signal to the processor. At least one of the processor voltage regulator or the system clock generator is further configured determine a desired frequency of the system clock signal responsive to the present processor load state, and determine a voltage level for the core voltage signal suitably paired with the desired frequency for proper operation of the processor at the desired frequency. Other systems, apparatuses, and methods are provided.

20 Claims, 6 Drawing Sheets

(56) References Cited

U.S. PATENT DOCUMENTS

| | | |
|---|---|---|
| 2003/0071657 A1 | 4/2003 | Soerensen et al. |
| 2003/0074591 A1 | 4/2003 | McClendon et al. |
| 2008/0189569 A1* | 8/2008 | Chu .............................. 713/600 |
| 2010/0017636 A1* | 1/2010 | Hashimoto et al. ........... 713/322 |
| 2010/0117579 A1* | 5/2010 | Culbert et al. ................ 318/471 |
| 2011/0010567 A1* | 1/2011 | Schmitz et al. ............... 713/300 |

OTHER PUBLICATIONS

PCT Written Opinion for PCT/US2010/047372, mailed May 13, 2011, 4 pages.

* cited by examiner

SYSTEMS, APPARATUSES AND METHODS FOR DYNAMIC VOLTAGE AND FREQUENCY CONTROL OF COMPONENTS USED IN A COMPUTER SYSTEM

TECHNICAL FIELD

Embodiments of the present disclosure relate generally to dynamic power regulation in a computer system and, more particularly, to systems, apparatuses and methods related to dynamic voltage and frequency control of components used in a computer system.

BACKGROUND

Electronic device components, such as processors and other integrated circuits (IC), typically require a stable power source. Voltage regulators play an important role in the proper operation of a large number of modern electronic circuits. Voltage regulators may generate a regulated supply voltage for certain components of an integrated circuit device. Voltage regulators can provide a supply voltage to memory cell arrays within memory devices, such as DRAM or SRAM. Processor voltage regulators generally receive one voltage from a power supply unit (e.g., battery) and supply a second voltage (i.e., core voltage) to a processor, also known as a microprocessor.

The processor in a computer system tends to require more power than other integrated circuits in a computer system. Therefore, reducing power consumption of the processor and of other peripheral devices (such as memory, northbridge, etc.) may have a significant impact on the power consumption of the entire computer system. A "processor" may refer generally to any apparatus that performs logic operations, computational tasks, control functions, etc. A processor may include one or more subsystems, components, and other processors. A processor may further include various logic components that operate using a clock signal to latch data, advance sequence logic states, synchronize computations and logic operations, provide other timing functions, and combinations thereof.

Power savings in a processor and other peripheral devices of a computer system may have benefits such as extending the usage times between battery charges in a battery-operated computer system, such as notebook computers, personal digital assistants, cell phones, and other systems that may be battery operated and have a processor. Even in non-battery operated computer systems, excessive power consumption may cause higher operational costs and excessive heat. Additionally, increasing governmental and environmental standards may require reducing the power consumed in a computer system.

There is a specific relationship between power consumption of a processor and the operating voltage and frequency of the processor. Most processors currently in use are made using CMOS technology. The power consumed by a CMOS IC (e.g., a processor) is generally proportional to the square of the voltage supplied to the IC multiplied by the operating frequency of the IC according to the equation:

$$P = cV^2 F \quad (1)$$

where V is the voltage supplied to the IC, F is the operating frequency of the IC, and c is a known constant determined by the IC operating at V and F. Given the relationship from equation (1), it can be seen that reducing the frequency or the voltage of a processor will result in a reduction of the power consumed by the processor.

Frequency is a measure of performance of the processor. In order to conserve power, under-clocking may be desirable when decreased performance is acceptable. Alternatively, there may be situations where over-clocking to increase performance may be desirable. In general, an operating frequency has a minimum voltage at which the processor can operate and maintain proper operation. For example, the core voltage of a processor may be raised for increased frequencies such that the transient state of the voltage signals reaches above the tolerance voltage levels of the transistor gates of the processor. The required voltage may normally increase with increased frequency, and decreases with decreased frequency. Therefore, performance enhancement and power saving is influenced by this frequency/voltage relationship. It may be desirable to operate a processor at the lowest suitable voltage at a frequency that provides the computing power desired by the user at any given moment.

FIG. 1 illustrates a simplified block diagram of a motherboard 100 architecture including a conventional voltage regulation and clocking system for computer system (e.g., personal computer, personal digital assistant, cell phones, notebooks, servers, etc.). Motherboard 100 includes processor 110, northbridge 120, southbridge 125, memory 130, system clock generator 140, and super IO 150.

System clock generator 140 provides processor 110, northbridge 120, and memory 130 with a system clock signal 141. For voltage regulation, motherboard 100 includes a processor voltage regulator 160, a northbridge voltage regulator 162, and memory voltage regulator 164. Processor voltage regulator 160 regulates the voltage level from the power supply unit (not shown; e.g., battery or other DC power supply) to provide a voltage signal 161 (core voltage) to the processor 110. Processor voltage regulator 160 may be operably coupled to a driver 170 to drive a load current to the processor 110 through FETs 171-174 (also referred to herein as "phases"). In other words, processor voltage regulator 160 may be configured as a multiple-phase voltage regulator. Northbridge voltage regulator 162 provides a voltage signal 163 to the northbridge 120, and memory voltage regulator 164 provides a voltage signal 165 to the memory 130 responsive to reference voltages $V_{REF1}$ and $V_{REF2}$. Northbridge voltage regulator 162 and memory voltage regulator 164 may be configured as single-phase voltage regulators with built-in drivers to drive load currents through FETs 175, 176, respectively.

In operation, when the processor 110 powers up, the processor 110 sends an initial voltage identifier (VID) signal 180 to the processor voltage regulator 160 to inform the processor voltage regulator 160 how much voltage is desired by the processor 110. The appropriate voltage signal 161 is provided to the processor 110 in response to the VID signal 180. The system clock generator 140 provides the system clock signal 141 as the reference clock for the processor 110. The processor 110 may internally have some detection for processor loading, and the processor 110 may change a frequency of an internal clock generated responsive to the reference clock (system clock signal 141). The voltage required to support the change in the internal clock may provide the basis for the processor 110 to request a new voltage level from the processor voltage regulator 160 through VID signal 180. The processor voltage regulator 160 receives the new VID signal 180 from the processor 110, decodes the VID signal 180, and sends the new desired voltage signal 161 to the processor 110. However, the system clock signal 141 frequency remains the same.

In some circumstances, it may be desirable to override the VID signal 180. For this purpose, super IO 150 is operably coupled to the VID signal 180. External components such as the southbridge 125 may also override the voltage references $V_{REF1}$, $V_{REF2}$ to control other voltage regulators, such as northbridge voltage regulator 162 and memory voltage regulator 164. For example, some memory devices (e.g., DDR2, DDR3) may have specifications which require a higher voltage (e.g., 2.1V) than a nominal voltage for $V_{REF2}$ (e.g., 1.8V) of many conventional motherboards. The southbridge 125 may also control the system clock generator 140 by sending a signal to the system clock generator 140 to change the frequency of the system clock signal 141. The voltage and frequency control from the super IO 150 and southbridge 125 may be static in nature, and may be determined responsive to a user command via a hardware-triggered interrupt, the BIOS, or some other software command.

FIG. 2 illustrates a simplified block diagram of a motherboard 200 architecture including another conventional voltage regulation and system clocking system for a computer system. Motherboard 200 includes components similar to those employed in FIG. 1, including processor 110, northbridge 120, memory 130, system clock generator 140, processor voltage regulator 160, northbridge voltage regulator 162, memory voltage regulator 164, driver 170, and FETs 171-176. Voltage signals 161, 163, 165 are provided to processor 110, northbridge 120, and memory 130, respectively, as is system clock signal 141. A VID signal 180 is provided to processor voltage regulator 160 from processor 110. Motherboard 200 further includes ASIC 252 and glue logic 254.

In operation, ASIC 252 and glue logic 254 perform a similar function of voltage regulation and changing system clock frequency as do the super IO 150 and southbridge 125 of FIG. 1. However, in addition to static changes in voltage and frequency, glue logic 254 may detect loading on the processor and then inform the ASIC to change the voltage signals 161, 163, 165 through sending commands to processor voltage regulator 160, northbridge voltage regulator 162, and memory voltage regulator 164, respectively. ASIC 252 may also control the system clock generator 140 by sending a command to the system clock generator 140 to change the frequency of the system clock signal 141.

Other conventional systems (not shown) may initiate a change in the system clock frequency and processor voltage by other commands initiated from the processor 110 to the system clock generator 140 or the processor voltage regulator 160. However, in each of the conventional architectures described above, changing the voltage and frequency relies on commands initiated and controlled by components external to the system clock generator 140 and the voltage regulators 160, 162, 164. The use of such external components for load detection, and initiating commands for changing system clock frequency and various voltages, may reduce responsiveness to load changes of the processor 110, and add undesired delay to changing the system clock frequency and voltages for different components of the computer system. Undesired delay may result in situations where the system frequency and voltages of the different components may be mismatched relative to each other, to the processor 110 load state, or both. These mismatched situations may occur frequently as processor load may change often, which may adversely affect the computer system with inefficiencies from wasted power consumption, errors, a lack of desired performance enhancement, computer system instability, or any combination thereof.

The inventors have appreciated that there exists a need for a system clock generator and voltage regulators of a computer system to better respond to the computational demands on a processor as the computational demands of the processor vary with time.

BRIEF SUMMARY

Embodiments of the present disclosure include a system for dynamic frequency and voltage control. The system comprises a processor voltage regulator and a system clock generator directly coupled with each other. The processor voltage regulator is for providing a core voltage signal to a processor, and is configured to detect a present processor load state of the processor. The system clock generator is for providing a system clock signal to the processor. At least one of the processor voltage regulator or the system clock generator is further configured to determine a desired frequency of the system clock signal responsive to the present processor load state, and determine a voltage level for the core voltage signal suitably paired with the desired frequency for proper operation of the processor at the desired frequency. The system further comprises an indicator of at least one of the desired frequency or the voltage level to be communicated over the communication interface between the processor voltage regulator and the system clock generator.

In another embodiment of the present disclosure, a system clock generator is provided. The system clock generator is configured to generate a system clock signal to provide to a processor, determine a desired frequency of the system clock signal responsive to present processor load information received from a processor voltage regulator through a direct communication link, and adjust the system clock signal to be the desired frequency.

In another embodiment of the present disclosure, a processor voltage regulator is provided. The processor voltage regulator is configured to provide a voltage signal to a processor, detect a present processor load state of the processor, send an indicator directly to a system clock generator for the system clock generator to dynamically adjust a system clock signal to a desired frequency responsive to the present processor load state, and determine a voltage level for the voltage signal suitably paired with the desired frequency for proper operation of the processor at the desired frequency.

Yet another embodiment of the present disclosure includes a method for dynamically controlling voltage and frequency of a computer system. The method comprises detecting a present processor load state of a processor to determine present processor load state information, communicating the present processor load state information between a processor voltage regulator and a system clock generator via a direct communication link, dynamically adjusting a frequency of a system clock signal of a computer system to a desired frequency responsive to the present processor load state information, and dynamically adjusting a core voltage to the processor responsive to the present processor load state information at a voltage level for suitable functioning of the processor at the desired frequency.

DETAILED DESCRIPTION

Figure 1:
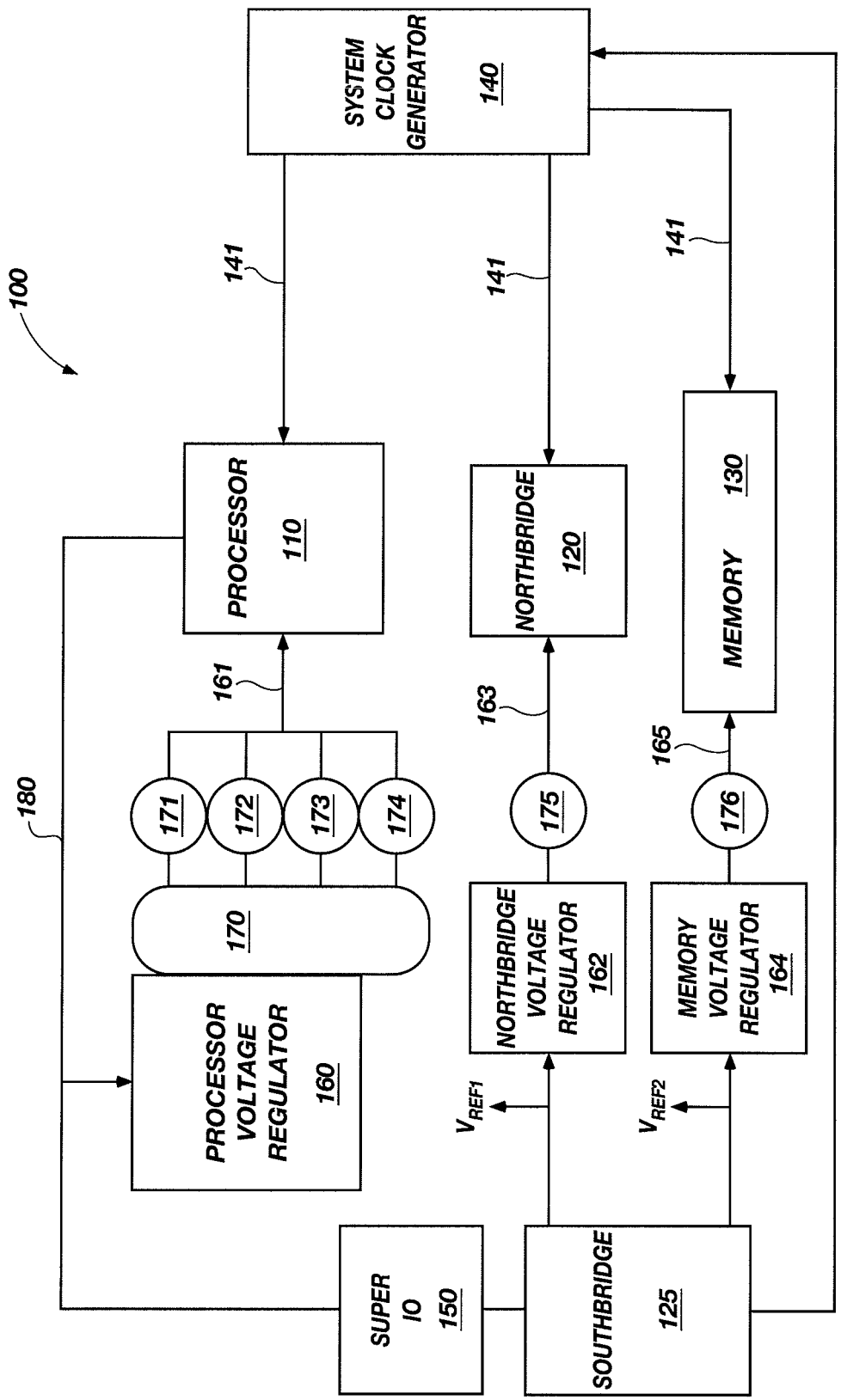
FIG. 1 illustrates a simplified block diagram of a motherboard architecture including a conventional voltage regulation and system clocking system for computer system.

In the following description, elements, circuits, and functions may be shown in block diagram form in order not to obscure the present invention in unnecessary detail. Conversely, specific implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Furthermore, in this description of embodiments of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Those of skill would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Embodiments of the present disclosure include systems, apparatuses, and methods for dynamic frequency and voltage control of components used in a computer system. As the computational demands on a processor vary with time, there may be opportunities to reduce one, or both, of the clock frequency and the voltage level applied to the processor. Thus, the power consumption of the device may be dynamically adjusted to reflect the processing requirements (i.e., computation load and number of processes operating over a given time) of the processor.

Figure 3:
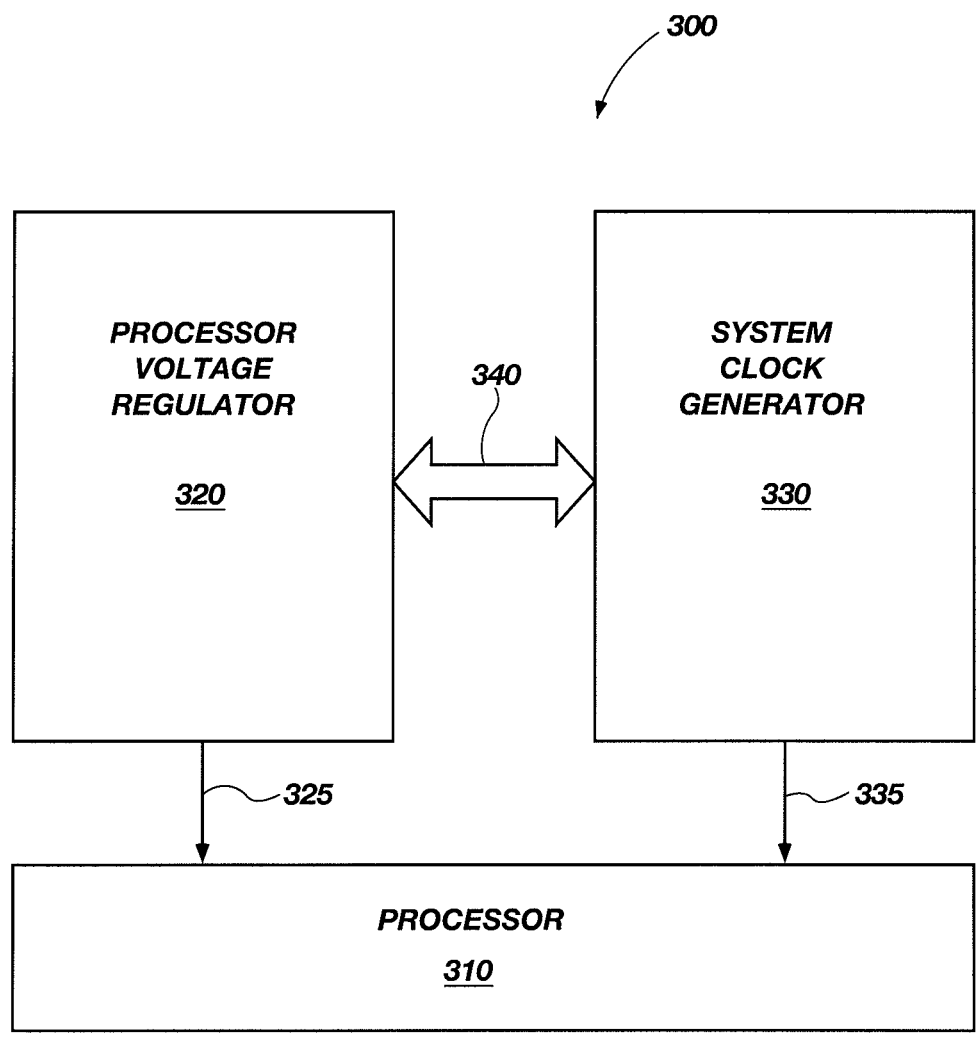
FIG. 3 illustrates a simplified block diagram of a frequency/voltage control system for a processor according to an embodiment of the present invention.

FIG. 3 illustrates a simplified block diagram of a frequency/voltage control system 300 for a processor 310 according to a particular embodiment of the present invention. Frequency/voltage control system 300 includes a processor 310, processor voltage regulator 320, and system clock generator 330. System clock generator 330 and processor voltage regulator 320 are operably coupled through interface 340. Processor voltage regulator 320 is operably coupled to processor 310 to provide processor 310 with a voltage signal 325 at some voltage level. System clock generator 330 is operably coupled to processor 310 to provide processor 335 with a system clock signal 335 at some frequency.

Figure 2:
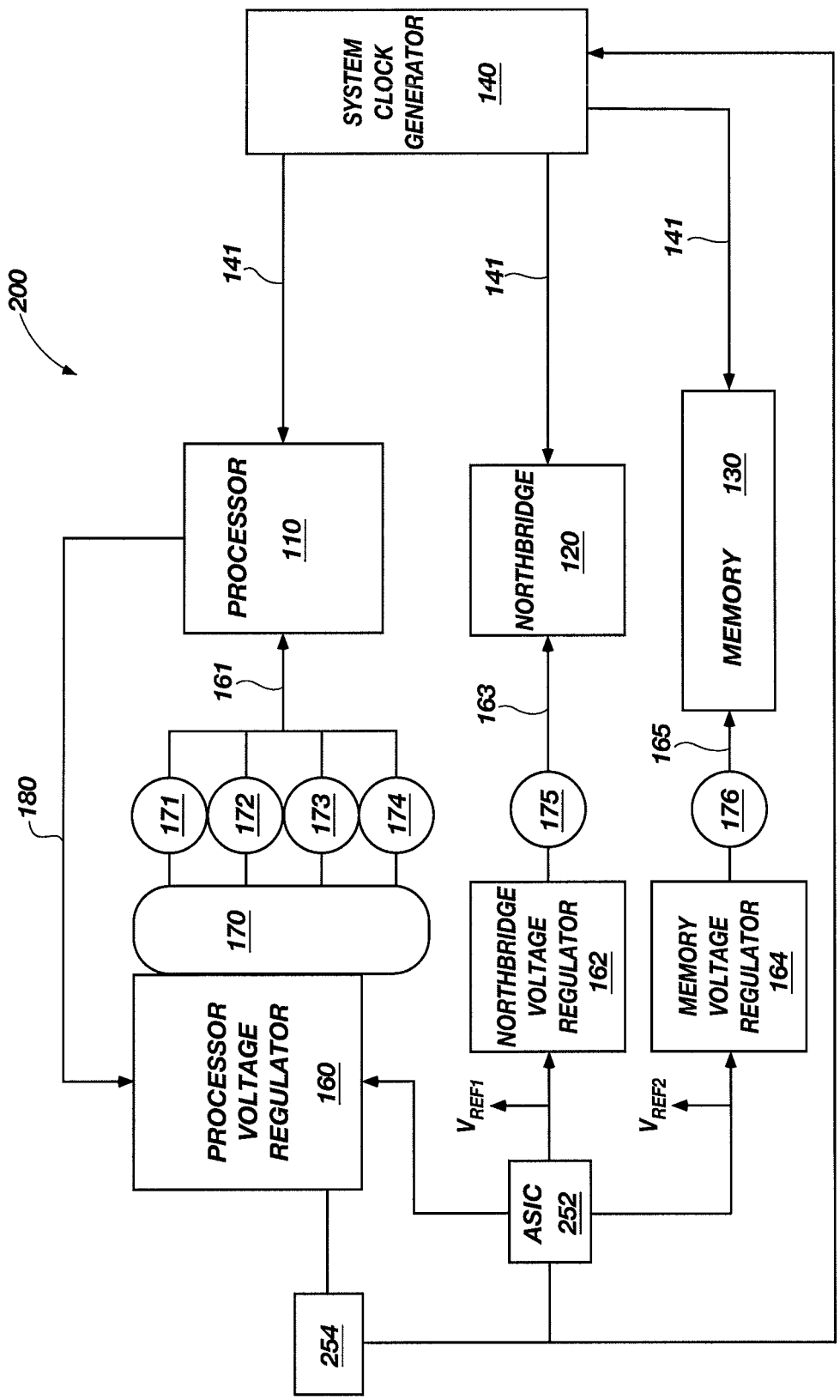
FIG. 2 illustrates a simplified block diagram of a motherboard architecture including another conventional voltage regulation and system clocking system for a computer system.

The processor voltage regulator 320 may detect the load of the processor through environmental telemetry data, such as measured load current drawn by the processor, temperature of a current inductor of the processor voltage regulator 320, and a combination thereof. The processor voltage regulator 320 may include various on-board sensors (not shown) in order to detect the environmental telemetry data used for determining the load of the processor. An indicator of the detected environmental telemetry data, or a command derived therefrom, is transferred directly from the processor voltage regulator 320 to the system clock generator 330 through interface 340, rather than by using commands initiated by, or transferred through, external components (e.g., super IO, southbridge, ASIC, glue logic of FIG. 1 and FIG. 2) as in conventional systems, which rely on the multiple system components to inform the system clock generator of a needed frequency through the system management bus (SMBUS) or through other hardware controls. Processor voltage regulator 320, and other voltage regulators described herein, may include a Pulse-Width Modulation (PWM) voltage regulator, low-dropout (LDO) voltage regulator, linear regulator socket, or another suitable voltage regulator for regulating the voltage from a power supply to a component of a computer system.

The system clock generator 330 may have settings (i.e., "trip points") stored in at least one register (e.g., in a look-up table) therein, with the trip points correlating a desired frequency for the system clock signal 335 for the present processor load state responsive to the environmental telemetry data detected by the processor voltage regulator 320. In other words, the trip points are significant points related to processor load in which the system should react by dynamically changing the frequency of the system clock signal 335 and any associated voltage signals (e.g., voltage signal 325). The trip points may be pre-programmed into the system clock generator 330 to assign a desired frequency for the system clock signal 335 for a particular processor load state. The pre-programming of the trip points may occur by the client (e.g., via southbridge, BIOS, operating systems such as Windows, Linux, etc.) setting the trip points and may be updated or changed from time to time. Along with determining a desired frequency for the system clock signal 335 responsive to a present processor load state, a desired voltage level for voltage signal 325 may be determined for the system to properly function with the desired frequency for system clock signal 335. For example, a look-up table may be stored on one or more registers of the processor voltage regulator 320, the system clock generator 330, or both, in order to determine the appropriate frequency/voltage pairing for the present processor load state.

Interface 340 operably couples processor voltage generator 320 and system clock generator 330 to form a programmable communication channel therebetween. Depending on the use, the interface 340 may be required to transfer a relatively large amount of information such that a plurality of wires may be used (i.e., multiple bits may be transferred at a time) which may form a bus.

In operation, the processor voltage regulator 320 detects the load of the processor 310. Processor load detection may be accomplished from on-board sensors on the processor voltage regulator 320 to detect environmental telemetry information, such as load current and temperature. For example, the processor load may be detected as being increased as the load current drawn by the processor 310 from the processor voltage regulator 320 is increased. An increased processor load may occur, for example, when a user runs a program that requires many processes to be run (e.g., gaming, video, live streaming, etc.). In that situation, it may be desirable to have increased performance (higher operating frequency of the system clock signal 335) which may require a corresponding higher voltage. Alternatively, the processor load may be detected as being decreased as the load current drawn by the processor 310 from the processor voltage regulator 320 is decreased. A decreased processor load may occur, for example, when a user runs a program that requires fewer processes to be run (e.g., basic word processing program, internet surfing, etc.) or enters idle, sleep, or hibernation mode. Of course, one skilled in the art will recognize that an increase or decrease in processor load (and corresponding desired increase/decrease in frequency and voltage) is relative to the previous processor load state. In other words, it may be desirable to decrease the frequency of the system clock signal 335 when the processor is in a low processor load state to an even lower frequency and corresponding voltage for even further power savings. The same may be true in increasing a frequency relative to an already high frequency when a processor load is relatively increased over the previous processor load state.

The processor load information (e.g., environmental telemetry data such as the value of the load current, or a command derived therefrom) is sent from processor voltage regulator 320 to the system clock generator 330 via interface 340. The system clock generator 330 decodes the information received from the processor voltage regulator 320 and compares the information with the trip points stored in a register of the system clock generator 330. From the trip points, the system clock generator 330 may determine what frequency for the system clock signal 335 is desired depending on the processor load information. For example, for a certain load current drawn from the processor voltage regulator 320 by the processor 310, the system clock generator 330 may have stored therein, a certain desired frequency corresponding to that certain load current, or a range of load currents.

The voltage level of the voltage signal 325 may depend on the frequency of the system clock signal 335 determined by the trip points of the system clock generator 330 responsive to the processor load information. The processor voltage regulator 320 may also determine (responsive to a similar set of information stored in a register therein) what the corresponding voltage level for the processor 310 is desired for suitable functioning of the system at the frequency for the desired system clock signal 335 responsive to the processor load information. Accordingly, the processor voltage regulator 320 sends the voltage signal 325 at the desired voltage level to the processor 310, and the system clock generator 330 sends the system clock signal 335 at the desired frequency to the processor 310. Removing the external components in the load detecting, and communication via interface 340 between the processor voltage regulator 320 and the system clock generator 330 may cause the voltage signal 325 and the system clock signal 335 to be sent to the processor 310 with a relatively low amount of delay. This reduced delay allows for the system clock frequency and voltage to be dynamically adjusted essentially in real time (substantially simultaneously) in relation to changes in processor loading, which may reduce wasted power consumption in the under-load situation, and increase performance in the over-load situation. Additionally, wasted power consumption and errors from periods of mismatched frequency/voltage pairs during transitions may be reduced.

One example has been given in which the system clock generator 330 determines the desired frequency for the system clock signal 335 responsive to environmental telemetry data sent by the processor voltage regulator 320. As mentioned, the processor voltage regulator 320 may have trip points stored therein, in order to determine a suitable frequency for the present processor load state. With that determination, the processor voltage regulator 320 may encode and send a command to the system clock generator 330 over interface 340 to direct system clock generator 330 to transmit a system clock signal 335 at a certain frequency to processor 310. As processor voltage regulator 320 may perform the determination of processor load, and also determine the desired frequency of the system clock signal 335, additional information may not be required to be sent from system clock generator 330 to processor voltage regulator 320 for processor voltage regulator 320 to determine a voltage to be paired with that particular frequency of the system clock signal 335. However, some data may be transmitted from the system clock generator 330 to the processor voltage regulator 320 such as in handshaking, or other desired intercommunication.

The frequency/voltage control system 300 can be, therefore, programmable through the system clock generator 330, processor voltage regulator 320, or both, such that the major actors and reactors in the dynamic frequency and voltage change are the processor voltage regulator 320 and system clock generator 330. Using the processor voltage regulator 320 and the system clock generator 330 as the major actors and reactors of the frequency/voltage control system 300, rather than using other, external components, may reduce the undesired delay for dynamic frequency and voltage control. Reduced delay may result in the frequency/voltage control system being more responsive to real-time adjustments in the processor load, being more efficient in increasing power saving, reducing errors, and increasing performance, as the case may be.

Although the simplified block diagram of system 300 shows dynamic voltage and frequency control of a processor 310, dynamic voltage and frequency control of other peripheral devices in a computer system may be included in embodiments of the present invention. Examples of such peripheral devices include a northbridge, graphics system, memory, and other peripheral devices which may receive a system clock signal 335 and for which it may be desirable to change the frequency and voltage received by the peripheral device responsive to changes in the processor load. Additionally, despite the use of the term "processor voltage regulator" and "processor," embodiments of the present invention may also apply to power management of system-on-a-chip (SOC) devices.

Figure 4:
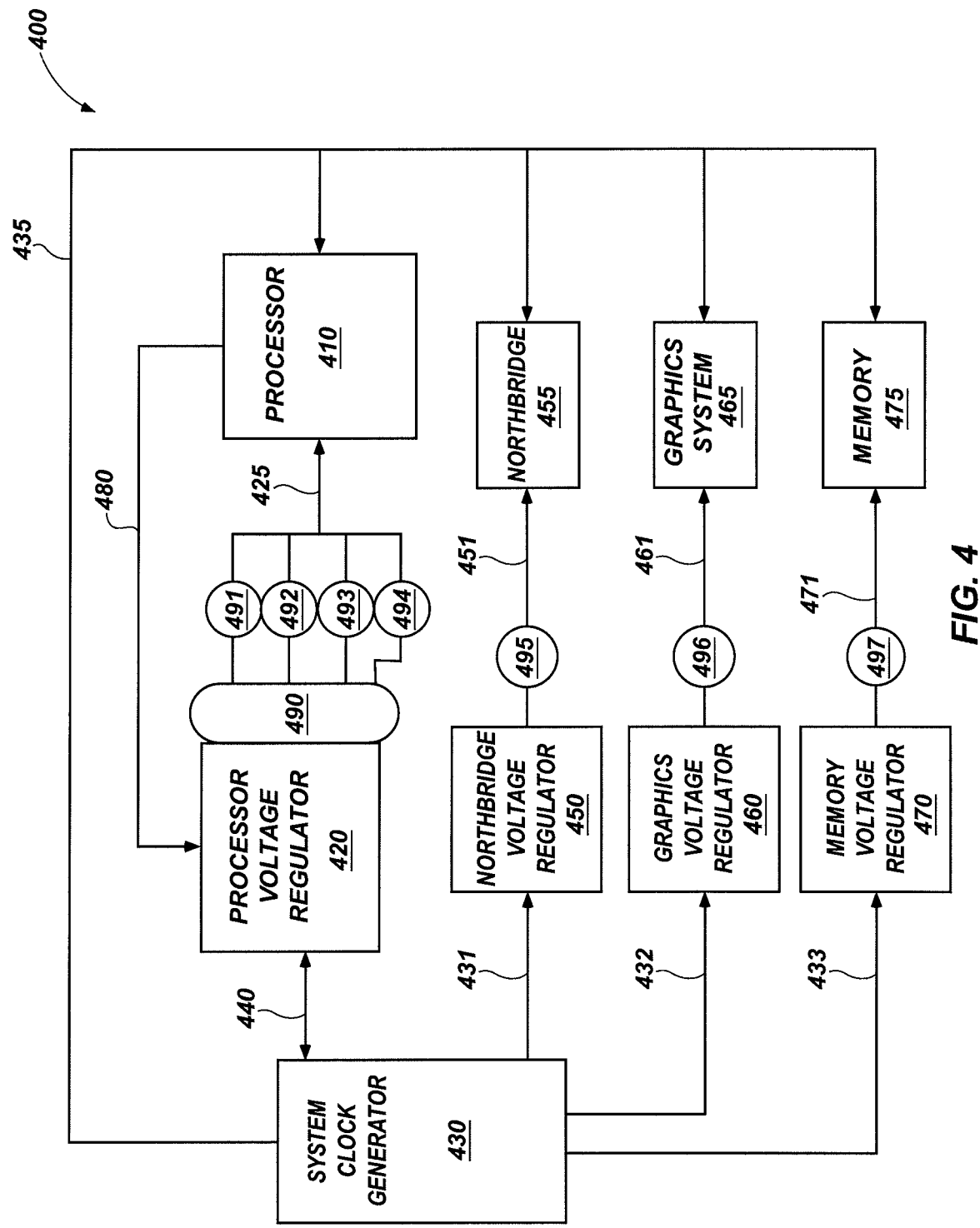
FIG. 4 illustrates a simplified motherboard architecture for a voltage regulation and system clocking system for a computer system according to an embodiment of the present invention.

FIG. 4 illustrates a simplified motherboard 400 architecture for a voltage regulation and system clocking system for a computer system according to an embodiment of the present invention. Motherboard 400 includes a processor 410, a processor voltage regulator 420, and a system clock generator 430. System clock generator 430 provides a system clock signal 435 to processor 410. Processor voltage regulator 420 regulates the voltage level from the power supply unit (not shown, e.g., battery) to provide a voltage signal 425 (core voltage) to the processor 410. Processor voltage regulator 420 may be operably coupled to a driver 490 to drive a load current to the processor 410 through FETs 491-494 (also referred to herein as "phases"). In other words, processor voltage regulator 420 may be configured as a multiple-phase voltage regulator. Details of multiple-phase control is discussed more fully below. The processor voltage regulator 420 is shown to have four phases; however, more or fewer phases may be used depending on the requirements of the system.

In operation, processor voltage regulator 420 determines the load of the processor, such as through measuring processor load current, current inductor temperature, or a combination thereof. The processor voltage regulator 420 may send the processor load information (e.g., environmental telemetry information, or a command derived therefrom) to the system clock generator 430 over communication interface 440 (also referred to herein as a direct communication link). The system clock generator 430 determines the desired frequency for the system clock signal 435 responsive to the processor load information. The system clock generator 430 may have pre-programmed settings stored in a register therein to match certain frequencies with processor load states. These pre-programmed settings may be referred to herein as trip points and may change (e.g., be reprogrammed, have multiple trip point tables to select between depending on user preferences) through a user command or system command. The processor voltage regulator 420 may update (i.e., change) the voltage level of the core voltage (voltage signal 425) provided to the processor 420 to correspond to the desired frequency of the system clock signal 435.

Motherboard 400 may also include other peripheral devices for which voltage regulation and system clock frequency control responsive to processor load may be desirable. Exemplary peripheral devices include northbridge 455, graphics system 465, and memory 475. The system clock generator 430 may provide the system clock signal 435 to each of the northbridge 455, graphics system 465, and memory 475. The system clock generator 430 may further be configured to generate a reference voltage responsive to the processor load for one or more of the peripheral devices (455, 465, and 475). The system clock generator 430 may include a built-in voltage reference generator, and a register that correlates processor loading information, frequency, and the voltage required for each of the peripheral devices (455, 465, and 475). Once a desired voltage is determined responsive to the processor load information and the updated frequency, the system clock generator 430 may generate and send the appropriate corresponding reference voltage (431, 432, 433) to the voltage regulators (450, 460, and 470) for the peripheral devices (455, 465, and 475, respectively). Northbridge voltage regulator 450 provides a voltage signal 451 to northbridge 455 by driving a load current through FET 495. Graphics voltage regulator 460 provides a voltage signal 461 to graphics system 465 by driving a load current through FET 496. Memory voltage regulator 470 provides a voltage signal 471 to memory 475 by driving a load current through FET 497. The motherboard 400 may further include other peripheral devices that are not illustrated herein, but which may nevertheless receive the system clock signal 435 and/or receive a voltage signal that may be adjusted responsive to the dynamic adjustment of the system clock signal 435 according to embodiments of the present invention. Examples of other components not shown herein include memory termination circuitry, system chipset, chipset interface circuitry, etc. Although the other voltage regulators (e.g., 450, 460, 470) are shown to be single-phase voltage regulators, multiple-phase voltage regulators may be used depending on the requirements of the computer system and/or individual peripheral devices.

Along with dynamic frequency and voltage control, detection of the processor loading may be used to determine the efficiency of the processor voltage regulator 420 (and other multiple-phase voltage regulators) by controlling the phases. For example, when the processor 410 is determined to be in relatively reduced loading state, each phase may not need to be enabled at the same time. In such an example, one of the phases, such as FET 491, may be enabled and one or more phases, such as FETs 492-494, may be disabled from supplying a load current to the processor 410. Other examples of a higher processor loading state may include enabling more than one phase.

Figure 5:
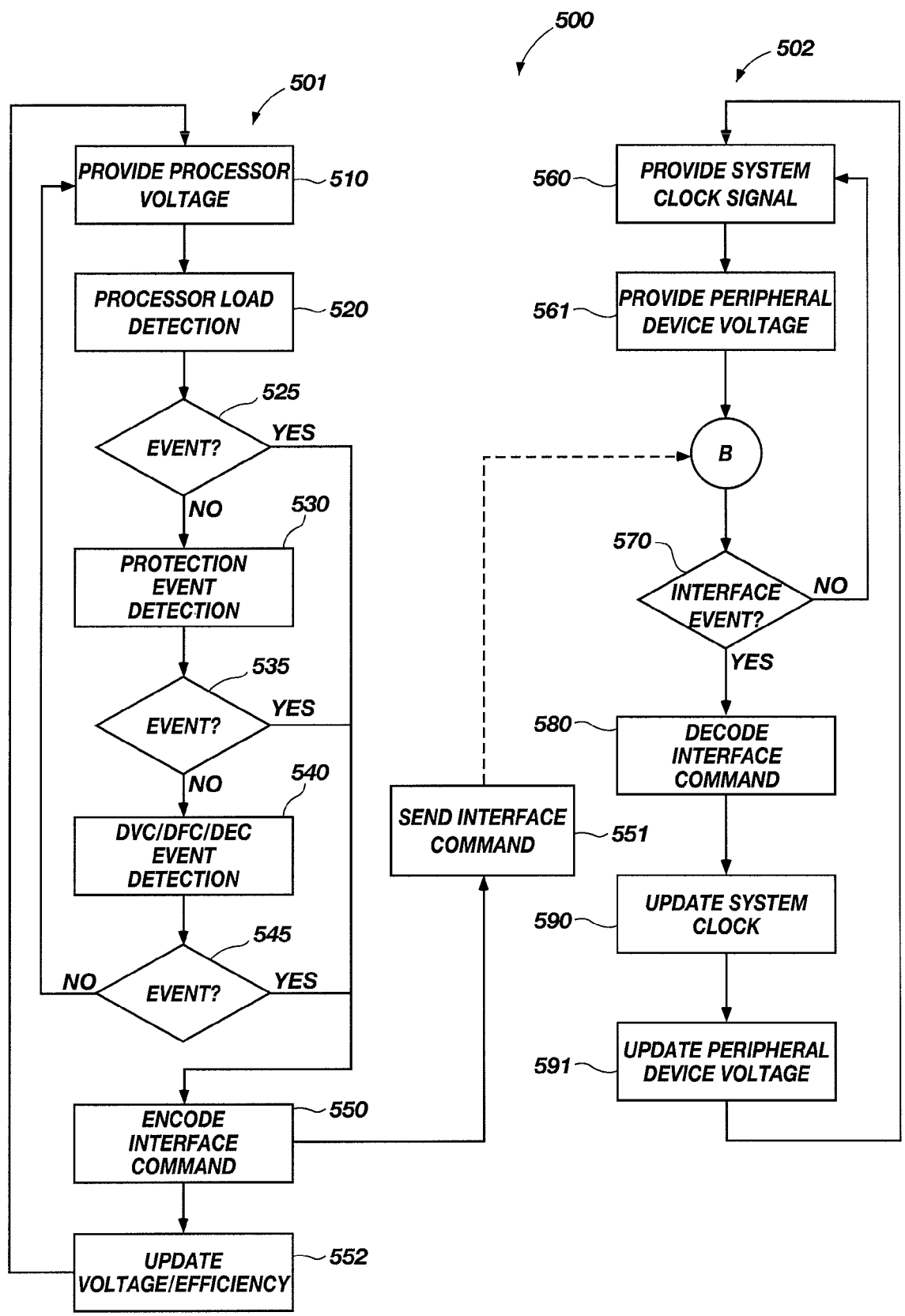
FIG. 5 is a flow chart illustrating dynamic control of the core voltage and system clock frequency of a computer system according to an embodiment of the present invention.

FIG. 5 is a flow chart illustrating a process 500 for dynamic control of the core voltage and system clock frequency of a computer system according to an embodiment of the present invention. Operations and decisions that occur on the left side 501 of flow chart 500 may occur within a processor voltage regulator chip. Operations and decisions that occur on the right side 502 of flow chart 500 may occur within a system clock generator chip. Each of the left side 501 and the right side 502 are closed loops that may occur concurrently on their respective chips to dynamically act and react to changes in the processor loading and other events which may affect the dynamic changes to the voltages and system clock frequency of the computer system.

Starting at operation 510, a voltage is provided to the processor of a computer system by a processor voltage regulator. Providing a voltage to the processor may include a DC-to-DC converter providing the proper voltage level for the frequency needed for the present processor load state of the computer system.

At operation 520, the load of the processor is detected. Processor load detection may occur with environmental telemetry data, such as measuring the load current drawn from the processor voltage regulator by the processor, temperature sensing, or other load detection practices. At decision 525, a decision may be made as to whether an increase or decrease of processor load has occurred. If an increase or decrease event in processor load has not occurred, then the process continues at operation 530. If an increase or decrease event in processor load has occurred, then an interface command may be encoded and sent to the system clock generator at operations 550 and 551 to adjust the frequency responsive to the load current drawn by the processor. Additionally, the voltage to the processor may be updated accordingly at operation 552.

Operation 530 detects whether there is a protection event. A protection event may be settings to determine whether over current or over voltage is occurring at a level that may threaten to burn or otherwise damage the processor. For example, a specification by the motherboard manufacturer may specify a maximum current drawn before endangering the reliability of the processor. If a protection event is detected at decision 535, then an interface command may be encoded and sent to the system clock generator at operations 550 and 551 to adjust the frequency responsive to the protection event detected. Additionally, the voltage to the processor may be updated accordingly at operation 552.

At operation 540, detection is made for changes to dynamic voltage, dynamic frequency, and dynamic efficiency control settings, which may be user controlled or system controlled. These settings may be encoded into the processor voltage regulator. For example, the user may be permitted to send a command to the processor voltage regulator to operate at certain power usage setting (e.g., 70% power) which may affect the frequency/voltage pairs for the trip points for certain processor load states. The user may have additional control such as having the capability to specify that the computer run in a "green" setting to have less power consumed, or to have increased performance settings which may cause the computer to operate at a higher-than-normal rate of operation for each frequency/voltage pair of a trip point triggered by the processor loading.

At decision 545, a decision may be made as to whether a user-controlled event has occurred. If such a user-controlled event has not occurred, then no change to the voltage and frequency may be necessary and control loops back to operation 510. If a user-controlled event is detected, then an interface command may be encoded and sent to the system clock generator at operations 550 and 551 to adjust the frequency responsive to the frequency/voltage pairs for the new trip points set by the user-controlled settings. Additionally, the voltage to the processor may be updated accordingly at operation 552.

As can be seen by the operations and decisions of 520-545, if certain events (discussed above) do not occur, then changes may not be made to the present voltage and commands may not be sent to the system clock generator to change the frequency of the system clock signal, and the present voltage is continued to be provided to the processor at act 510. However, if these certain events do occur, then an interface command may be encoded and sent to the system clock generator at operations 550 and 551 with a request to update the frequency of the system clock signal to a desired frequency corresponding to the present load information or other detected event. When such a command is sent to the system clock generator at operations 551, it should be noted the effect that such a command has at point B on the right side 502 of the flow chart 500 to invoke certain system clock generator events. Additionally, the voltage to the processor may be updated accordingly at operation 552.

As mentioned previously, the loop on the right side 502 of flow chart 500 represents operations that may occur as a closed loop within the system clock generator. Starting at operation 560, the system clock generator may provide a system clock signal at a desired frequency to devices of the system, such as the processor and other peripheral devices. The devices may use the system clock signal for timing of executions within the device, or as a reference clock from which internal clocks within the devices may be based (e.g., multiplied or divided from the reference clock). As discussed above, the system clock generator may be configured to provide peripheral devices with a reference voltage that may be changed dynamically responsive to processor loading. At operation 561, one or more reference voltages for such peripheral devices are provided.

At decision 570, a decision is made as to whether an interface event has occurred, in other words, whether or not a command has been received by the clock generator from the processor voltage regulator. Thus, an interface command being sent may affect the right side 502 loop at Point B by affecting the outcome of decision 570. If an interface event has not occurred, then the system clock generator may continue the system clock signal at the present frequency, and the peripheral device voltages at their present voltage levels according to operations 560 and 561. In other words, no events were detected by the processor voltage regulator, which would have caused a command to be sent to the system clock generator to update the frequency of the system clock signal. If, however, the processor voltage regulator had detected an event, an interface command would be sent at operations 551, and an interface event would be detected when the right side 502 loop reaches the interface event decision at decision 570. In that case, the interface command is decoded at operation 580, the system clock is updated at operation 590 to the appropriate frequency according to the interface command and the register setting within the system clock generator. Additionally, at operations 591 the voltage levels for the voltage references of the peripheral devices may be updated according to the interface command and the register setting within the system clock generator.

With the dynamically changing voltages of the processor and peripheral devices, and the updated frequency of the system clock signal, the computer system may automatically respond by drawing more or less current and allow the computer system to reach an equilibrium state until the next significant change in processor loading.

Figure 6:
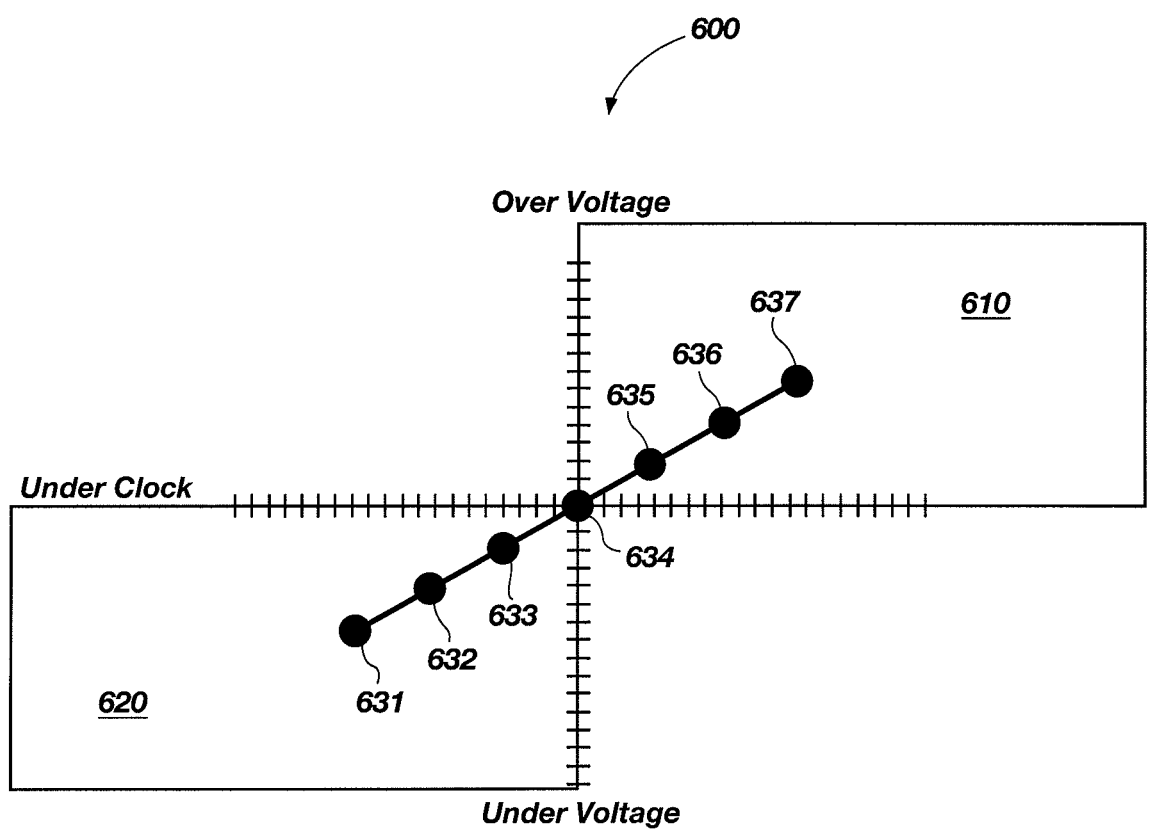
FIG. 6 is a graph illustrating dynamic control of the core voltage and system clock frequency and the relationship between the voltage and frequency of the processor according to an embodiment of the present invention.

FIG. 6 is a graph 600 illustrating dynamic control of the core voltage and system clock frequency and the relationship between the voltage and frequency of the processor according to an embodiment of the present invention. The horizontal axis of graph 600 represents the frequency of the system clock. The left half of the horizontal axis represents an under-clock situation, and the right half of the horizontal axis represents an over-clock situation. The vertical axis of graph 600 represents the voltage level of the voltage signal entering the processor. The upper half of the vertical axis represents an over-voltage situation, and the lower half of the vertical axis represents an under-voltage situation.

The origin of graph 600 represents a situation of normal processor loading in which neither power savings nor increased performance is occurring. The upper right quadrant 610 represents the situation of enhanced system performance responsive to a detected higher than normal processor load. Enhanced system performance occurs by increasing the frequency of the system clock, and correspondingly increasing the voltage to the processor (and possibly other appropriate peripheral devices). The lower left quadrant 620 represents the situation of power saving responsive to a detected lower than normal processor load. Power saving occurs by responding to a reduced processor load and decreasing the frequency of the system clock, and correspondingly decreasing the voltage to the processor (and possibly other appropriate peripheral devices).

The frequency of the system clock and the voltage of a processor (and other appropriate peripheral devices) may be dynamically adjusted responsive to a detected processor load. Graph 600 shows seven distinct frequency/voltage pairs, which correspond to the trip points 631-637 responsive to processor load information. Discussion regarding increasing or decreasing frequency and/or voltage is in relation to the current status, and not necessarily in relationship to the trip point 634 at the origin. In other words, the system clock signal and associated voltage signal(s) may be operating according to trip point 635 such that the system is operating in an enhanced-performance state. If a sufficient increase in processor load is detected such that trip point 636 is triggered, the system clock frequency and corresponding voltage may increase to enter into an even greater enhanced-performance state. The same relationship is true for detecting a decrease in processor load and decreasing system clock frequency and voltage for a trip point 631-633 shown in the quadrant of power saving 620.

Although graph 600 shows the relationship between processor loading, the desired system clock frequency, and the corresponding desired voltage to be a linear relationship, such a linear relationship is one example shown for illustration purposes, and not as a limitation. One or more trip points 631-637 may be non-linear. Additionally, seven distinct and discrete trip points (and corresponding frequency/voltage pairs) are shown in graph 600; however, more or fewer trip points may be stored in the system clock generator, the processor voltage regulator, or both. Furthermore, while discussion on trip points have thus far been defined by a set of values stored in registers or memory, those of ordinary skill in the art will recognize that the trip points may be determined with mathematical representations of frequency relative to voltage.

The processor may experience a constant change in loading. Changing the frequency/voltage pair may further cause the loading to increase or decrease as the case may be, which may trigger a different trip point even if no change has been made in the process or program being run by the computer system. Depending on the user settings and system requirements, the trip points may determine how fine the steps between the trip points should be, what processor load ranges the trip points should trigger to a new frequency/voltage pair, and how often the frequency/voltage pairs should be dynamically changed.

While the present invention has been described herein with respect to certain illustrated embodiments, those of ordinary skill in the art will recognize and appreciate that it is not so limited. Rather, many additions, deletions, and modifications to the embodiments may be made without departing from the scope of the claims. In addition, features from one embodiment may be combined with features of another embodiment while still being encompassed within the scope of the invention as contemplated by the inventors.

What is claimed is:

1. A system for dynamic frequency and voltage control, the system comprising:
   a processor voltage regulator configured to provide a core voltage signal to a processor, and further configured to detect a present processor load state of the processor;
   a system clock generator directly coupled with the processor voltage regulator through a communication interface, the system clock generator configured to:
   provide a system clock signal to the processor;
   provide the system clock signal to peripheral devices of the system; and
   provide at least one voltage signal to the peripheral devices of the system;
   wherein at least one of the processor voltage regulator or the system clock generator is configured to:
   determine a desired frequency of the system clock signal responsive to the present processor load state;
   determine a voltage level for the core voltage signal suitably paired with the desired frequency for operation of the processor at the desired frequency; and
   communicate an indicator of at least one of the desired frequency or the voltage level over the communication interface between the processor voltage regulator and the system clock generator; and
   wherein the system clock generator is further configured to change the at least one voltage signal provided to the peripheral devices of the system responsive to the present processor load state.

2. The system of claim 1, wherein the processor voltage regulator is configured to detect the present processor load state responsive to a load current drawn by the processor and measured by the processor voltage regulator.

3. The system of claim 1, wherein the processor voltage regulator is configured to detect the present processor load state responsive to sensing a temperature of a current inductor of the processor voltage regulator.

4. The system of claim 1, wherein the system clock generator includes trip points stored in a register of the system clock generator, wherein the trip points correlate the present processor load state with the desired frequency.

5. The system of claim 1, wherein the processor voltage regulator is configured to send the indicator to the system clock generator from which the system clock generator determines the desired frequency.

6. The system of claim 1, wherein the peripheral devices include at least one of a memory device, a memory termination circuitry, a system chipset, chipset interface circuitry, and a graphics device.

7. The system of claim 1, wherein the system clock generator comprises a voltage reference generator configured to generate at least one reference voltage and sending the at least one reference voltage to at least one voltage regulator for at least one of the peripheral devices of the system.

8. The system of claim 6, wherein the system clock generator further comprises at least one other voltage reference generator configured to generate at least one other reference voltage and sending the at least one other reference voltage to at least one other voltage regulator for at least one of the peripheral devices of the system.

9. The system of claim 1, wherein the processor voltage regulator is a multiphase voltage regulator.

10. The system of claim 9, wherein the processor voltage regulator is configured to enable and disable phases of the multiphase voltage regulator responsive to the present processor load state.

11. A system clock generator, configured to:
generate a system clock signal to provide to a processor;
determine a desired frequency of the system clock signal responsive to present processor load information received from a processor voltage regulator through a direct communication link;
adjust the system clock signal to be the desired frequency;
provide a reference voltage to peripheral devices of a computer system; and
dynamically adjust the reference voltage responsive to the system clock signal being adjusted to be the desired frequency.

12. The system clock generator of claim 11, wherein the system clock generator comprises at least one register including trip points, wherein the trip points correlate the present processor load information with the desired frequency.

13. The system clock generator of claim 11, wherein the present processor load information is an indicator generated by the processor voltage regulator and decoded by the system clock generator.

14. A method for dynamically controlling voltage and frequency of a computer system, the method comprising:
detecting a present processor load state of a processor to determine present processor load state information;
communicating the present processor load state information between a processor voltage regulator and a system clock generator via a direct communication link;
dynamically adjusting a frequency of a system clock signal generated by the system clock generator and provided to a computer system to a desired frequency responsive to the present processor load state information;
dynamically adjusting a core voltage generated by the processor voltage regular and provided to the processor responsive to the present processor load state information at a voltage level for suitable functioning of the processor at the desired frequency; and
dynamically adjusting a voltage generated by the system clock generator and provided to a peripheral device of the computer system corresponding to the desired frequency.

15. The method of claim 14, wherein dynamically adjusting the frequency and the core voltage includes correlating a desired core voltage and the desired frequency in a table of trip points responsive to the present processor load state information.

16. The method of claim 15, further comprising receiving a user command altering a setting for adjusting at least one of the trip points used in the dynamically adjusting the frequency and the core voltage.

17. The method of claim 14, wherein dynamically adjusting the frequency and the core voltage includes determining trip points with mathematical representations of the frequency relative to the voltage responsive to the present processor load state information.

18. A method, comprising:
receiving present processor load state information from a processor voltage regulator;
dynamically adjusting a frequency generated by a system clock signal of a computer system to a desired frequency responsive to the present processor load state information;
providing a peripheral voltage from the system clock generator to a peripheral device of a computer system corresponding to the desired frequency; and
dynamically adjusting the peripheral voltage generated by the system clock generator.

19. The method of claim 18, wherein the peripheral device is selected from the group consisting of a northbridge, a graphics system, a memory, memory termination circuitry, system chipset, and chipset interface circuitry.

20. The system clock generator of claim 11, further comprising a voltage reference generator and a register configured to correlate the processor load information, frequency, and the reference voltage required for each peripheral device.

* * * * *